United States Patent
Marchesi et al.

(10) Patent No.: US 11,452,935 B2
(45) Date of Patent: Sep. 27, 2022

(54) VIRTUAL CARD GAME SYSTEM

(71) Applicant: LEGO A/S, Billund (DK)

(72) Inventors: Roberto Marchesi, Vejle (DK); Melissa Jane Pickering, Vejle (DK); Maiken Hillerup Fogtmann, Vejle (DK); Henrik Munk Storm, Randbøl (DK); Rasmus Harr, Vejle (DK); Cephas Edgar Howard, Billund (DK)

(73) Assignee: LEGO A/S, Billund (DK)

( * ) Notice: Subject to any disclaimer, the term of this patent is extended or adjusted under 35 U.S.C. 154(b) by 0 days.

(21) Appl. No.: 16/347,533

(22) PCT Filed: Nov. 10, 2017

(86) PCT No.: PCT/EP2017/078835
§ 371 (c)(1),
(2) Date: May 3, 2019

(87) PCT Pub. No.: WO2018/087268
PCT Pub. Date: May 17, 2018

(65) Prior Publication Data
US 2020/0094134 A1    Mar. 26, 2020

(30) Foreign Application Priority Data
Nov. 11, 2016 (DK) .......................... PA 2016 70893

(51) Int. Cl.
*A63F 13/213* (2014.01)
*A63F 13/42* (2014.01)

(52) U.S. Cl.
CPC ............ *A63F 13/213* (2014.09); *A63F 13/42* (2014.09)

(58) Field of Classification Search
CPC .............................. A63F 13/213; A63F 13/42
See application file for complete search history.

(56) References Cited

U.S. PATENT DOCUMENTS

| 3,005,282 A | 10/1961 | Christiansen |
| D253,711 S | 12/1979 | Christiansen et al. |
| (Continued) | | |

FOREIGN PATENT DOCUMENTS

| CN | 104334238 A | 2/2015 |
| EP | 1714683 A1 | 10/2006 |
| (Continued) | | |

OTHER PUBLICATIONS

International Search Report and Written Opinion issued in corresponding international application No. PCT/EP2017/078835, dated Feb. 15, 2018.

(Continued)

*Primary Examiner* — Yingchuan Zhang
(74) *Attorney, Agent, or Firm* — Day Pitney LLP; Anthony A. Kassas

(57) ABSTRACT

A game system comprising: a plurality of game tokens, an image capturing device and a processor; the image capturing device being operable to capture one or more images of one or more game tokens placed within a field of view of the image capturing device; wherein the processor is configured to: execute a digital game, the digital game comprising computer executable code configured to cause the processor to implement a virtual card game, the virtual card game including a plurality of virtual playing cards; receive one or more images captured by said image capturing device; recognise one or more game tokens of the plurality of game tokens within the one or more images; responsive to recognising a set of game tokens in the one or more images, create a virtual playing card based on the recognised set.

18 Claims, 6 Drawing Sheets

(56) References Cited

U.S. PATENT DOCUMENTS

| | | | |
|---|---|---|---|
| 7,690,975 B2* | 4/2010 | Watanabe | A63F 13/655 463/1 |
| 2003/0062675 A1 | 4/2003 | Noro et al. | |
| 2005/0272502 A1 | 12/2005 | Marks | |
| 2006/0073892 A1* | 4/2006 | Watanabe | A63F 13/95 463/34 |
| 2009/0115133 A1 | 5/2009 | Kelly et al. | |
| 2009/0197658 A1* | 8/2009 | Polchin | A63F 13/02 463/9 |
| 2012/0049453 A1 | 3/2012 | Morichau-Beauchant et al. | |
| 2012/0295703 A1 | 11/2012 | Reiche et al. | |
| 2013/0123009 A1* | 5/2013 | Maharbiz | A63F 3/00643 463/31 |
| 2014/0256430 A1 | 9/2014 | Matsumura | |
| 2014/0378023 A1 | 12/2014 | Muthyala et al. | |
| 2018/0018821 A1 | 1/2018 | Reagan et al. | |
| 2020/0094134 A1 | 3/2020 | Marchesi et al. | |

FOREIGN PATENT DOCUMENTS

| | | |
|---|---|---|
| EP | 1779907 A1 | 5/2007 |
| EP | 2714222 A1 | 4/2014 |
| EP | 2744580 B1 | 6/2014 |
| EP | 2749327 A1 | 7/2014 |
| EP | 2862604 A1 | 4/2015 |
| WO | 2011017393 A1 | 2/2011 |
| WO | 2012160055 A1 | 11/2012 |
| WO | 2013122798 A1 | 8/2013 |
| WO | 2005113086 A1 | 12/2015 |
| WO | 2016050757 A1 | 4/2016 |

OTHER PUBLICATIONS

International Preliminary Report on Patentability (includes correspondence and amended pages of claims attached thereto), issued in corresponding international application No. PCT/EP2017/078835, dated Mar. 29, 2019.

Get sucked into the game!; SickBricks [online]; [retrieved on Mar. 28, 2017 using www.archive.org dated Feb. 14, 2015] Retrieved from the internet <URL http://webarchive.org/web/20150214155129/sickbricks.com/game-info.php>.

How to Play Sick Bricks: YouTube [online]; [retrieved on Mar. 28, 2017 using www.youtube.com dated Feb. 12, 2015] Retrieved from internet <URL https://www.youtube.com/watch?v=VFSQuAUFoSU> (Video is unavailable).

Search Report and Written Opinion issued in related Danish patent application No. PA 2016 70810, dated Mar. 31, 2017.

International Search Report and Written Opinion issued in related international application No. PCT/EP2017/075730, dated Feb. 19, 2018.

International Preliminary Report on Patentability (includes correspondence and amended pages of claims attached thereto), issued in related international application No. PCT/EP2017/075730, dated Jan. 18, 2019.

First Office Action issued in corresponding Chinese Patent Application No. 201780081917.0, dated Mar. 14, 2022, 12 pages (English Translation only).

First Office Action issued in corresponding Chinese Patent Application No. 201780075049.5, dated Jan. 28, 2022, 10 pages (English translation only).

* cited by examiner

VIRTUAL CARD GAME SYSTEM

CROSS-REFERENCE TO RELATED APPLICATIONS

This application is a U.S. National Stage of International Application No. PCT/EP2017/078835, filed on Nov. 10, 2017 and published on May 17, 2018, as WO 2018/087268 A1, which claims the benefit of priority to Danish Patent Application No. DK PA201670893, filed on Nov. 11, 2016. The content of each of the above referenced patent applications is incorporated herein by reference in its entirety for any purpose whatsoever.

The present invention relates to the application of computer vision technology for toys-to-life applications and, more particularly, to a game system employing such technology.

BACKGROUND OF THE INVENTION

Different attempts of integrating physical objects into virtual game play have been made. However, it remains desirable to provide ways of linking the physical world and a virtual game play which may stimulate the interactive involvement of the user and provide entertaining game play. Therefore there is a need for a new approach to interactive game play.

Most toy-enhanced computer games or so-called toys-to-life systems currently involve systems wherein toys must have a physical component configured to communicate with a special reader via some form of wireless communication like RFID, NFC etc. Examples of such systems are disclosed in e.g. US 2012/0295703, EP 2749327 and US 2014/256430. It would be generally desirable to provide game systems that do not require the toy to comprise elements that are capable of communicating with a reader device so as to be able to identify a toy element, and to create its virtual digital representation and associate it with additional digital data.

WO 2011/017393 describes a system that uses computer vision to detect a toy construction model on a special background. In this prior art system, an assembled model is on a special background plate with a specific pattern printed on it.

EP 2 714 222 describes a toy construction system for augmented reality.

The digital game available under the name LEGO NEXO Knights allows users to scan codes from a collection of scannable codes. The codes represent in-game powers.

In view of this prior art it remains desirable to provide improved game systems that provide additional mechanisms for users interacting with the game system.

SUMMARY

In accordance with one aspect, disclosed herein are embodiments of a game system that comprises: a plurality of game tokens, an image capturing device and a processor. The image capturing device is operable to capture one or more images of one or more game tokens placed within a field of view of the image capturing device. The processor is configured to:
  execute a digital game, the digital game comprising computer executable code configured to cause the processor to implement a virtual card game, the virtual card game including a plurality of virtual playing cards;
  receive one or more images captured by said image capturing device;
  recognise one or more game tokens of the plurality of game tokens within the one or more images;
  responsive to recognising a set of game tokens in the one or more images, create a virtual playing card based on the recognised set.

Hence, the game system allows the user to interact with the digital game by presenting game tokens to the game system such that the image capturing device captures one or more images of the game tokens and the processor recognises the game tokens. The game system creates a virtual playing card based on the recognised game tokens, thus allowing the user to craft user-defined virtual playing cards by constructing physical representations of the playing card using game tokens. The processor is configured to create a digital representation, such as a visual representation, of the virtual playing card wherein the visual representation is created based on the recognised set of game tokens, i.e. depends on the recognised set of game tokens.

As the game system creates a virtual playing card based on the recognised game tokens, the system provides a tangible, easy-to-use user interface for creating one or more virtual playing cards, e.g. a user-defined deck of virtual playing cards. Each set of game tokens is defined by its members, i.e. by the game tokens making up the set. Moreover, each set of game tokens is a subset of the plurality of game tokens such that the set includes two or more game tokens.

In some embodiments, the processor is further configured to provide game functionality for controlling use of the created virtual playing card as a part of the virtual card game. Use of the created virtual playing card may be determined by a set of game rules which may determine conditions under which a virtual playing card may be used within the game and which may determine the effect the use of a playing card has on the digital game play. In embodiments of the game system, use of the created virtual playing card may trigger one or more game events where the game events depend on the recognised set of game tokens based on which the virtual playing card has been created.

Accordingly, the user may create a plurality of user-defined virtual playing cards for use in a digital card game. The effect each virtual card has in the digital game may depend on the combination of game tokens that are combined to represent the playing card. In some embodiments, the user may be required to physically assemble the physical representation of the virtual playing card each time the user wishes to use the virtual card. In other embodiments, the user may be able to create a virtual deck of one or more virtual playing cards for subsequent use where a new virtual playing card is added to the deck when the user captures an image of an assembled physical representation of a new card.

Once created, the subsequent use of the virtual playing cards may be unlimited or limited by the game rules, e.g. to a single use, a use during a predetermined period of time, a limited number of uses, a use until a condition for use is no longer fulfilled, etc. In some embodiments, the number of virtual playing cards that may be available in a deck of virtual playing cards at any time may be limited. For example, when the maximum number of virtual playing cards in the deck is reached, the process may require an existing virtual playing card to be discarded before creating a new virtual playing card. Moreover, any such limitations may be imposed by the game system on the total number of virtual playing cards and/or on the number of virtual playing cards of a certain type.

Recognising a set of game tokens comprises recognising each of the game tokens forming the set. Recognising the set of game tokens may further comprise recognising multiple game tokens as a set of game tokens that triggers creation of a virtual playing card.

A game system may comprise different types of game tokens. For example, the game tokens may be classified into different types according to which type of game element they represent. In particular, the game system may comprise one or more game tokens that represent a virtual game item of a digital game item; these game tokens may be referred to as item tokens. The digital game may thus comprise computer executable code configured to cause the processor to control at least said virtual game item. Examples of virtual game items include virtual characters, such as a virtual player character that is controlled by the game system in direct response to user inputs, or a non-player character that is controlled by the game system based on the rules of the game. An item token associated with a virtual character will also be referred to as a character token. Other examples of virtual game items include virtual objects such as inanimate objects, accessories that can be used by virtual characters, e.g. weapons, vehicles, clothing, armour, food, other types of ingame resources, locations within a virtual environment, e.g. a building, etc.

Further examples of game tokens include an event token representing a game event, such as unlocking of game characters, causing game characters to perform certain actions, the spawning of characters or objects, making a capability or an item available to a virtual character, etc. Further examples of game tokens may represent game assets such as capabilities, in-game currencies, health, a progression, etc. Examples of capabilities may include a strength, a power, an attack move, or the like. Game tokens representing a game asset will also be referred to as asset tokens. In some embodiments at least some types of game tokens may have a visual appearance, e.g. a shape and/or size and/or color, that distinguishes them from other types of game tokens, thus making the type of a game token easily recognisable to the user. For example, character tokens may have a visual appearance distinguishable from event tokens or asset tokens.

In some embodiments, the processor is configured to recognise a plurality of game tokens as a set of game tokens that triggers creation of a virtual playing card only if the plurality of game tokens fulfils one or more predetermined conditions. The predetermined conditions may include one or more conditions chosen from the following conditions: a condition imposed on the number of recognised game tokens, a condition imposed on a type of recognised game tokens, a condition imposed on the spatial configuration in which the recognised game tokens are arranged. Accordingly, while providing a large degree of freedom in crafting user-defined cards, the game system imposes a set of restrictions that facilitate a user to craft playing cards that are consistent with the available functionality of a digital game and that are easy to follow. Accordingly, the user does not need to make a large number of attempts of creating playing cards that have a desired effect in the digital game which could otherwise be a frustrating and physically tiring experience.

Accordingly, in some embodiments, recognising the set of game tokens comprises recognising only predetermined sets of game tokens as sets that cause the processor to create a virtual playing card, e.g. sets comprising or consisting of a predetermined combination of game tokens or sets fulfilling one or more predetermined conditions, e.g. sets comprising or consisting of a minimum and/or maximum number of game tokens, sets consisting of an exact number of game tokens, sets comprising or consisting of respective minimum and/or maximum numbers of each of one or more predetermined types of game tokens, sets comprising or consisting of respective exact numbers of each of one or more predetermined types of game tokens, or other conditions imposed on the number and/or types of game tokens forming the set.

For example, in some embodiments, a plurality of game tokens is only recognised as a set if the plurality of game tokens includes a single game token of a first type and one, two or more, e.g. a predetermined number of, game tokens of a second type, different from the first type. The game token of the first type may be an item token representing a virtual game item such as virtual character, a virtual object, a player, a location in a virtual environment and/or the like. The game tokens of the second type may be asset tokens representing game assets that may be associated to the virtual game element represented by the item token. Use of the created virtual playing card may thus cause the asset(s) represented by the game token(s) of the second type to be made available to, or otherwise applied to or associated with, the virtual game item represented by the game token of the first type. Use of the virtual playing card in the digital game may affect an existing virtual game item or it may further cause the virtual game item to be spawned or otherwise appear in the digital game. For example, the game assets may include capabilities or accessories that may be carried, worn, obtained, used, or otherwise associated with the virtual game item. Other examples of game assets may include other virtual game elements that may interact with or otherwise be associated with the virtual game item represented by the game token of the first type.

The game tokens of the second type may also be game tokens that represent a feature, attribute, property or other element of a virtual game item. For example, when the game token of the first type represents a location in a virtual world, the game token of the second type may represent a property of the location, e.g. a simulated weather or other environmental parameter at said location. Use of the virtual playing card that has been created based on the game tokens of the first and second types during the digital game may thus cause the associated location to get the corresponding property, e.g. a change in the simulated weather or other environmental parameter.

Alternatively or additionally, when the game token of the first type represents a location in a virtual world, the game token of the second type may represent a virtual game character or object that may be spawned at the location. Accordingly, use of the virtual playing card that has been created based on the game tokens of the first and second types during the digital game may thus cause the identified virtual game character or object to be spawn, moved to or otherwise appear at the identified location.

Yet alternatively, when the game token of the first type represents a virtual character or a virtual object, the game token of the second type may represent a capability of the character or object, and/or it may represent an accessory or other game asset that may be used by the character or object, and/or it may represent a modification of the character or object. Use of the virtual playing card that has been created based on the game tokens of the first and second types during the digital game may thus cause the associated capability or other asset to be made available to the identified game character or object, or an identified modification of the game character or object to be applied, or the game character or object may be spawned where the game character or object has the identified game asset, modification etc.

Generally, the game token of the first type may represent a virtual game item and the game token of the second type may represent an attribute of a virtual game item, e.g. a modification, feature, property, or the like, of the virtual game item. Use of the virtual playing card that has been created based on the game tokens of the first and second types during the digital game may thus cause the attribute associated with the game token of the second type to be applied in respect of the virtual item associated with the game token of the first type, or the virtual game item may be caused to appear in the game where the virtual game item has the identified attribute. When a set of game tokens includes more than one game token of the second type, a combination of the individual attributes represented by the respective game tokens of the second type may be applied. In some embodiments some or all combinations of game tokens of the second type may cause further attributes to be applied, e.g. attributes that go beyond a mere aggregation of the individual attributes represented by the respective game tokens of the second type.

In some embodiments, a set of game tokens triggers creation of a virtual playing card only when the game tokens of the set are presented to the game system in a predetermined spatial configuration. Accordingly, in some embodiments, the processor is configured to recognise a plurality of game tokens as a set of game tokens that triggers creation of a virtual playing card only when the game tokens are positioned in a predetermined spatial configuration relative to each other, e.g. in a predetermined geometric pattern. Accordingly, the game interaction is made more predictable, as the risk is reduced that the user inadvertently creates undesired virtual playing cards. Moreover, a more flexible user-interface is provided. For example, in some embodiments, some or all of the game tokens may also be operable to trigger other game events, different from creating a virtual playing card, when recognised by the processor, e.g. when recognised as a single, individual game token, as part of a set of game tokens that does not trigger the creation of the playing card, or as a part of a set of game tokens that are arranged in a spatial configuration different from the predetermined spatial configuration. Accordingly, when the set of game tokens only triggers the creation of a virtual playing card when recognised in the predetermined spatial configuration, the risk is reduced that the recognised game tokens trigger the creation of a virtual playing card even if the user intended to trigger a different game event instead. For example, the user may have a large number of game tokens spread out on a table and the user may intend to capture an image of only one of the game tokens. In such a situation the user may inadvertently include other game tokens in the same image which may lead to undesired results. However, as it is less likely that the user has inadvertently positioned multiple game tokens in the required spatial configuration, the risk of an inadvertent triggering of the creation of an undesired virtual playing card is reduced. Accordingly, the risk for frustrating game experience is reduced. Nevertheless, the number of game events that may be triggered by a limited number of different game tokens is increased, as the game tokens can be combined with each other and/or with other game tokens in many different ways so as to form different sets. In some embodiments one or more attributes of the created playing card depend on the spatial configuration of the game tokens relative to each other in the captured image, e.g. which of the game tokens is positioned on which position within a spatial configuration.

In some embodiments, the predetermined spatial configuration comprises a two dimensional arrangement of two or two or more game tokens within a two-dimensional perimeter representing a playing card, e.g. a rectangular or other polygonal perimeter, a circular or oval perimeter, or the like. For example, the game system may comprise a base plate, a frame or another type of token holder, and the game tokens may be detachably attachable to a top face of a base plate, to the frame or otherwise detachably connected to a token holder, where the base plate, frame or other token holder represents a playing card. Alternatively, a game token, e.g. an item token, may have the form of a base plate or frame to which other game tokens can be detachably connected.

Generally, a predetermined spatial configuration of two or more game tokens relative to each other may be defined completely or in part by the respective positions of the two or more game tokens relative to each other, e.g. by the respective distances of the two or more game tokens from each other. The relative positions, e.g. the relative distances, may be derived by the processors from the one or more images. In particular, the predetermined spatial configuration may completely or at least in part be defined by the respective relative positions, e.g. relative distances, of the representations of the game tokens in the captured image. The distance between two game tokens may be defined as the distance between respective reference points of the game tokens, e.g. respective centroids of an image of the game token, by a corner or another visible reference feature. In some embodiments, the spatial configuration is completely or partly defined by a geometric configuration of the game tokens, e.g. by the game tokens defining corners of a predetermined polygon, e.g. a triangle or square, or by the positions of the game tokens defining another geometric pattern.

In some embodiments, the game tokens have a visual appearance such that their representation in a captured image is not rotationally symmetric within a two-dimensional image plane defined by the captured image, i.e. such that a relative orientation of two or more game tokens relative to each other can be determined from an image of the game tokens. In particular, the game tokens may have a visual appearance such that they are indicative of a reference direction at least when viewed from a predetermined viewing angle. The reference directions of two game tokens may thus be determined by the processor from the one or more images and used to determine a relative orientation of the game tokens relative to each other. The reference direction may e.g. be defined by an edge of the game token, by two spaced apart reference points, by an axis of symmetry, or the like. Accordingly, a predetermined spatial configuration of two or more game tokens may be defined completely or in part by the respective orientations of the two or more game tokens relative to each other. In some embodiments, the predetermined spatial configuration is defined completely or in part by the respective orientations and positions, e.g. distances, of the two or more game tokens relative to each other.

It will further be appreciated that the sensitivity of the game systems to deviations from a precise predetermined spatial configuration may vary. It will be appreciated that recognition of game tokens in a predetermined spatial configuration may require the game tokens to be positioned in the predetermined spatial configuration within certain tolerances, i.e. the processor may recognise game tokens as being positioned in a predetermined spatial configuration as long as they are such positioned within certain predetermined tolerances. These tolerances may be determined by the accuracy of the detection process. For example, in some embodiments, the processor may be configured to recognise a plurality of game tokens only as a set of game tokens that triggers creation of a virtual playing card when the game tokens are precisely positioned in a predetermined spatial configurations, e.g. within tolerances of a coupling mechanism of a toy construction system or within the accuracy of the recognition process employed. In some embodiments even larger tolerances may be accepted, so as to prevent frustrating user experiences. Hence, the system may be configured to accept relatively large deviations from an exact spatial configuration or to accept multiple spatial configurations while still recognising the plurality of game tokens as a set of game tokens that triggers creation of a virtual playing card.

In some embodiments, the processor is further configured, responsive to receiving a user-input or other game event indicative of an activation or use of the virtual playing card during the digital game, to activate and/or modify a user-activatable game item associated with the virtual playing card. In some embodiments, the digital game comprises computer executable code configured to cause the processor to control at least a first virtual game item; wherein the plurality of game tokens comprises an item token representing the first virtual game item; wherein the game tokens of a first recognised set comprise said item token and one or more game tokens of a second type, e.g. asset tokens; and wherein the processor is further configured, responsive to recognising the game tokens of the first recognised set, to create a virtual playing card operable, when used by a user during the digital game, to associate a game asset associated with the virtual playing card to the first virtual game item. In some embodiments, the processor is configured, responsive to receiving a user input indicative of a user's intention to use the created playing card during the digital game, to spawn the first virtual game item and to associate said game asset with the first virtual game item.

In some embodiments, creating the virtual playing card comprises associating one or more additional game-related attributes with the created playing card, e.g. a strength, impact, health, cost, etc. The additional game-related attributes may be different from the assets, items or events associated with each of the individual game tokens. Hence, use of the virtual playing card during the digital game may, in addition to the game elements represented by the individual game tokens, provide an additional effect on the digital game play. Creating the virtual playing card may further comprise determining a value of the additional game-related attribute at least in part based on the combination of game tokens of the recognised set. For example, in some embodiments, some or all game tokens may have associated one or more additional token attributes, e.g. represented by a color, a specific marker, an attribute value, and/or the like. The one or more additional game-related attributes may then be computed from a combination of the additional token attributes of the game tokens making up the set.

In some embodiments, only a plurality of predetermined sets of game tokens trigger the creation of a virtual playing card while sets other than the predetermined sets of game tokens do not trigger the creation of a virtual playing card. In some embodiments, any set of two or more game tokens that include one or more required types of game tokens, or at least any set having a predetermined number of members or having a predetermined minimum number of members may trigger the creation of a virtual playing card, optionally conditioned on the game tokens being positioned in the predetermined spatial configuration relative to each other.

In some embodiments, the association of a game element (e.g. a virtual game item such as a virtual object or a virtual character, a capability, game event a game asset, etc.) with a game token may be predetermined and static, i.e. the association may not change during the course of the game. In other embodiments, the association may not be static and/or the association may not be predetermined. For example, during the course of the game, the individual game element associated with a game token may change, e.g. based on a user input or based on another game event. When the association is not predetermined, the game token may initially not be associated to any game element. For example, once recognised for the first time, a game element may be assigned to the game token, e.g. a user-selected game element may be assigned to the game token. Once assigned, the association may be static or it may subsequently be changed again.

Many types of digital card games can be enhanced by creating virtual playing cards based on recognised game tokens including, but not limited to, nurture-games, battle type games (player vs. player or player vs. computer), trading card games, racing games, and role playing action/resource games, virtual construction games, multiplayer games, such as games including cooperative features or massive multiplayer online games, strategy games, augmented reality games, games on mobile devices, etc. In some embodiments the digital game comprises computer executable code configured to cause the processor to control at least one virtual game item.

In some embodiments, the game system further comprises a token holder for detachably receiving and, optionally, retaining game tokens. The token holder may be configured to receive game tokens in a single spatial configuration only, or in a limited number of spatial configurations. In some embodiments the token holder is configured for detachably receiving and, optionally, retaining two, three or more game tokens in said predetermined spatial configuration. In some embodiments, the game tokens each comprise one or more coupling members and the token holder comprises one or more coupling members operable for interengaging corresponding coupling members of the game tokens. The coupling members may be configured such that they allow connecting the game tokens with the token holder in predetermined respective positions and orientations relative to the token holder such that the two or more game tokens can be detachably received by the token holder in one or a limited number of predetermined spatial configurations relative to each other; optionally such that the game tokens can only be so received. Accordingly, the token holder may serve to aid the correct placement of the game tokens in one or more predetermined spatial configuration relative to each other, thus reducing the risk of unsuccessful recognition due to imprecise placement of the game tokens. Moreover, the token holder also helps to ensure that the game tokens remain in the predetermined spatial configuration during the image acquisition or in order to facilitate a repeated presentation of the same set of tokens.

In some embodiments, the processor may further be configured to recognise the token holder in addition to recognising the game tokens attached to the token holder, when an image is captured of the token holder with the game tokens attached to it. For example, to this end, the token holder may carry a machine-readable marker or may have a visually recognisable shape or other visually recognisable feature facilitating recognition of the token holder by the processor in a captured image.

Recognition of the token holder may further reduce the risk of inadvertent recognition of game tokens as a set. Alternatively or additionally, the token holder may serve as a game token or as a further modifier/trigger that influences one or more attributes of the created virtual playing card. In yet another embodiment, the token holder may serve as a physical unlock key whose recognition enables creation of virtual playing cards or of virtual playing cards of a certain type.

The visual representation of the virtual playing card in the digital game may resemble a physical playing card. For example, the virtual playing card may resemble a piece of heavy paper, thin cardboard, plastic-coated paper, cotton-paper blend, or thin plastic. The visual representation of the virtual playing card includes a set of distinguishing markings, icons, images, numbers, letters, motifs or other symbols, that serve to distinguish the playing card from other playing cards of a deck of cards and that indicate the use or effect of the playing card in a virtual card game. The symbols may be provided of a front side of each card. In some embodiments, the virtual playing card comprises a set of symbols each symbol representing one of the game tokens of the recognised set of game tokens. The set of symbols may be arranged on the front face of the playing card in a spatial configuration representing the spatial configuration in which the set of game tokens has been recognised. The front face of the playing cards may include additional markings, icons, images, numbers, letters, motifs or other symbols in addition to said set of symbols that represent the set of game tokens, e.g. other symbols representing the additional game-relevant attributes. Some or all of these additional markings or symbols may have a numerical value associated with them, for example, the numeric value may be computed from individual attribute values associated with the game tokens of the recognised set. The numeric value may be depicted on the front face of the virtual playing card. The back side of a virtual playing card may include a decorative pattern or the like. In some embodiments, the decorative pattern may be the same for all virtual playing cards while, in other embodiments, the decorative pattern may vary, e.g. depending on a recognised token token holder, depending on a type of recognised game tokens, dependent on a level of progression in the digital game, and/or the like.

Generally, in some embodiments, the game tokens may each comprise one or more coupling members configured for detachably attaching the game token to other game tokens and/or to a token holder in a predetermined spatial configuration to other game tokens. To this end the token holder may comprise mating coupling members configured for mechanical and detachable interconnection with the coupling members of the game tokens, e.g. in frictional and/or interlocking engagement. In some embodiments, the coupling members are compatible with a toy construction system such that the game tokens may also be used as toy construction elements operable to be detachably connected with other toy construction elements of the toy construction system, e.g. as decorative elements attachable to a toy construction model. Similarly, other toy construction elements of the toy construction system, different from the game tokens, may be connectable to the token holder or to the physical representation of the playing card along with the game tokens so as to allow a user to further personalize the sets of tokens and/or virtual playing cards. In some embodiments, the other toy construction elements may also be recognisable by the game system in a captured image. Accordingly they may be used to create a virtual playing card such that the virtual playing card has a visual appearance resembling the user-constructed physical playing card. In some embodiments, the other toy construction elements, other than the game tokens, do not trigger any game events. The other toy construction elements may be used to properly arrange game tokens in a predetermined spatial configuration, e.g. due to spatial constraints imposed by the toy construction system on the spatial configurations in which the toy construction elements can be interconnected with each other.

The game tokens may be physical tokens, such as toy objects, e.g. in the form of a plate, coin, cube, figurine or other tangible object. Alternatively or additionally, the game system may be operable to detect and recognise representations of a physical game token, e.g. an image or graphical representation depicting or otherwise visibly representing a physical token. The representation may be photorealistic or more schematic but sufficient for the game system to recognise the game token in a captured image of the representation. For example, the game system may be operable to capture images of stills, photographs, videos, other live videos or pictures displayed on other electronic devices, and use the thus captured images as a basis for the detection and recognition of game tokens.

In some embodiments, the game tokens may carry respective machine-recognisable markers that are recognisable by the processor in a captured image of the token. Alternatively or additionally, the game tokens may have a visually recognisable shape or other visually recognisable features. The game tokens may further have decorations or otherwise resemble or represent the game event, game element, game item etc. that is represented by the game token. This allows a user to associate the game tokens with the respective game elements and facilitates appropriate selection of tokens when crafting a playing card. In some embodiments, the game tokens have the form of tiles that have a top face on which decorations and/or machine recognisable markers are placed. The tiles may have one or more coupling members on a bottom face of the tile so as to allow a user to detachably fasten the tile to a token holder.

In some embodiments, the image capturing device is a camera, such as a digital camera, e.g. a conventional digital camera. The image capturing device may be a built-in camera of a portable processing device. Generally, examples of portable processing devices include a tablet computer, a laptop computer, a smartphone or other mobile device. In some embodiments, the image capturing device comprises a 3D capturing device such as a 3D sensitive camera, e.g. a depth sensitive camera combining high resolution image information with depth information. An example of a depth sensitive camera is the Intel® RealSense™ 3D camera, such as the model F200 available in a developer kit from Intel Corporation. The image capturing device may be operable to capture one or more still images. In some embodiments the digital camera is a video camera configured to capture a video stream.

The processor is adapted to detect the game tokens in the captured image(s) and to recognise the game tokens. Recognition of a game token further comprises identifying the corresponding game element (i.e. virtual game item, game asset, game event, and/or the like) associated with the recognised game token. To this end, the game system may comprise a library of known game tokens each associated with information about the corresponding associated individual game element. The library may further include information about known sets of two or more game tokens, each set being associated with information about the associated virtual playing card that is associated with said set. Alternatively or additionally, the association between sets of game tokens and corresponding virtual playing cards may be implemented by the processor based on a set of rules for determining, for a given set of game tokens, which virtual playing card is to be created. The rules may e.g. be part of the computer program code or stored separately.

In some embodiments, the game system may allow a user to capture an image of two or more sets of game tokens, each set representing a virtual playing card, i.e. the processor may be configured to recognise two or more sets of game tokens in the same image and to create corresponding two or more virtual playing cards. This may be useful e.g. in a battle type game, where each playing card represents a participant in a battle. It will be appreciated that the simultaneous creation of multiple virtual playing cards may also be useful in other game scenarios, e.g. when defining a team of game characters. Moreover, when recognising multiple sets of game tokens in a single image, the processor may further create one or more associations between the corresponding created playing cards, e.g. a restriction that the created virtual playing cards can only be used in combination with each other or that they cause a further game effect if used in combination.

Here and in the following, the term processor is intended to comprise any circuit and/or device suitably adapted to perform the functions described herein. In particular, the term processor comprises a general- or special-purpose programmable microprocessor, such as a central processing unit (CPU) of a computer or of another data processing system, a digital signal processor (DSP), an application specific integrated circuits (ASIC), a programmable logic arrays (PLA), a field programmable gate array (FPGA), a special purpose electronic circuit, etc., or a combination thereof. The processor may be integrated into a portable processing device, e.g. where the portable processing device further comprises the image capturing device and a display. It will be appreciated, however, that the game system may also be implemented as a client-server or a similar distributed system, where the image capturing and other user interaction is performed by a client device, while the image processing and recognition tasks may be performed by a remote host system in communication with the client device. According to some embodiments, an image capturing device or a mobile device with an image capturing device may communicate with a computer, e.g. by wireless communication with a computing device comprising a processor, data storage and a display.

In some embodiments, the image capturing device communicates with a display that shows in real-time a scene as seen by the image capturing device so as to facilitate targeting the desired event token(s) whose image is to be captured.

The present disclosure relates to different aspects including the game system described above and in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

In particular, according to one aspect, disclosed herein is a method, implemented by a processor, of operating a game system, the game system comprising a plurality of game tokens, an image capturing device and the processor; the image capturing device being operable to capture one or more images of one or more game tokens placed within a field of view of the image capturing device; wherein the method comprises:
  executing a digital game, the digital game comprising computer executable code configured to cause the processor to implement a virtual card game, the virtual card game including a plurality of virtual playing cards;
  receiving one or more images captured by said image capturing device;
  recognising one or more game tokens of the plurality of game tokens within the one or more images;
  responsive to recognising a set of game tokens in the one or more images create a virtual playing card based on the recognised set.

According to yet another aspect, disclosed herein is a processing device, e.g. a portable processing device, configured to perform one or more embodiments of the method disclosed herein. The processing device may comprise a suitably programmed computer such as a portable computer, a tablet computer, a smartphone, a PDA or another programmable computing device, e.g. a device having a graphical user-interface and, optionally, a camera or other image capturing device.

According to yet another aspect, disclosed herein is a computer program which may be encoded on a tangible computer-readable medium, such as a disk drive or other memory device. The computer program comprises program code adapted to cause, when executed by a processing device, the processing device to perform one or more of the methods described herein. The computer program may be embodied as a computer-readable medium, such as a CD-ROM, DVD, optical disc, memory card, flash memory, magnetic storage device, floppy disk, hard disk, etc. having stored thereon the computer program. In other embodiments, a computer program product may be provided as a downloadable software package, e.g. on a web server for download over the internet or other computer or communication network, or as an application for download to a mobile device from an App store. According to one aspect, a computer-readable medium has stored thereon instructions which, when executed by one or more processing units, cause the processing unit to perform an embodiment of the process described herein.

The present disclosure further relates to a toy construction set comprising a plurality of toy construction elements, including a plurality of game tokens, and instructions to obtain a computer program code that causes a processing device to carry out the steps of an embodiment of one or more of the methods described herein, when the computer program code is executed by the processing device. For example, the instructions may be provided in the form of an internet address, a reference to an App store, or the like. The instructions may be provided in machine readable form, e.g. as a QR code or the like. The toy construction set may even comprise a computer-readable medium having stored thereon the computer program code. Such a toy construction set may further comprise a camera or other image capturing device connectable to a data processing system.

Additional features and advantages will be made apparent from the following detailed description of embodiments that proceeds with reference to the accompanying drawings.

BRIEF DESCRIPTION OF THE DRAWINGS

Preferred embodiments of the invention will be described in more detail in connection with the appended drawings, where FIG. 1 schematically illustrates an embodiment of the game system described herein.

DETAILED DESCRIPTION

Embodiments of the method and system disclosed herein may be used in connection with a variety of toy systems and, in particular, with construction toys that use modular toy construction elements with various assembly systems like magnets, studs, notches, sleeves, with or without interlocking connection etc. Examples of these systems include but are not limited to the toy constructions system available under the tradename LEGO. For example, U.S. Pat. No. 3,005,282 and USD253711S disclose one such interlocking toy construction system and toy figures, respectively.

Figures 1, 3:
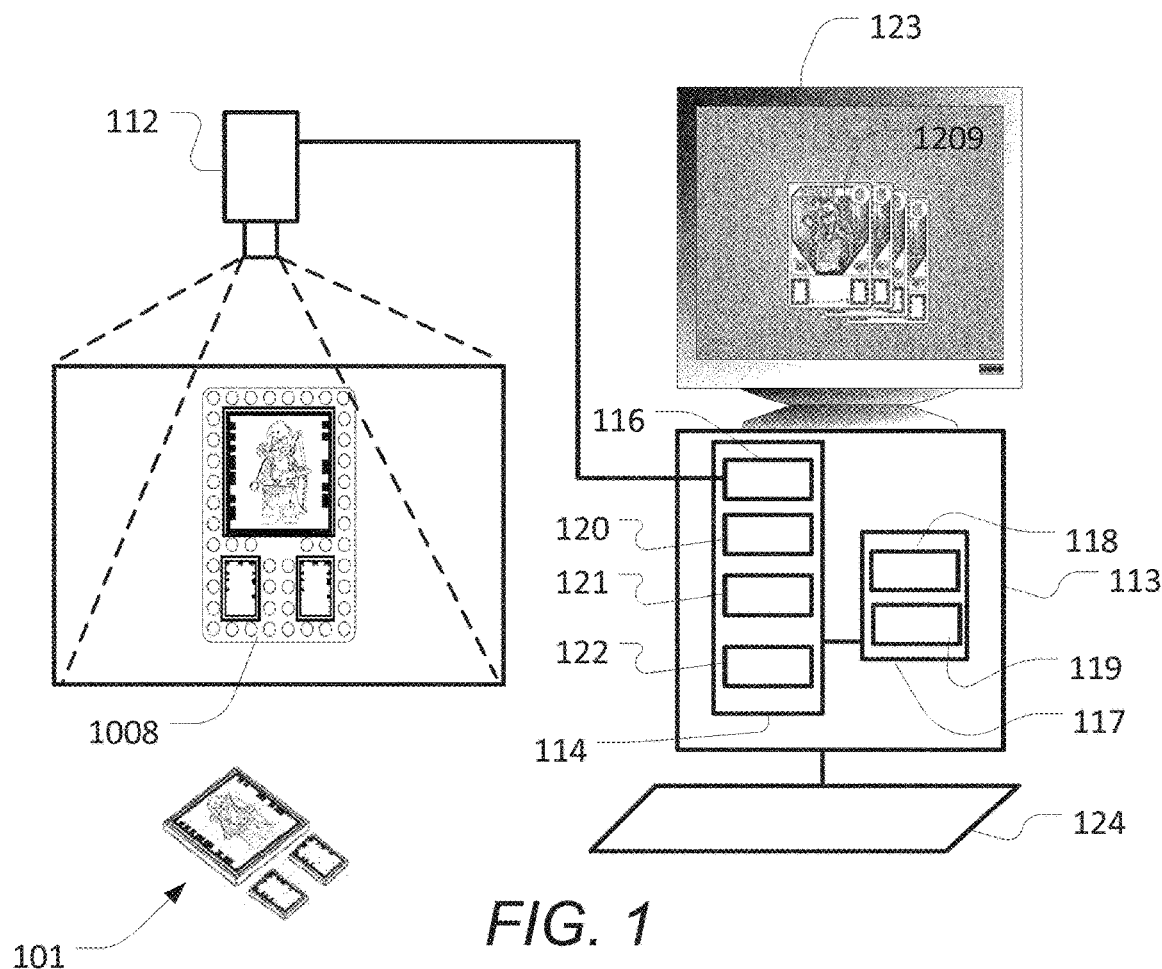
FIG. 3 schematically illustrates an example of a structure of a token library.

FIG. 1 schematically illustrates an embodiment of the game system described herein. The game system comprises a plurality of game tokens 101 and a data processing device.

The data processing device comprises an image capturing device 112, a processing unit 113, a display 123, and a user input interface unit 124, such as a keyboard, a mouse, a joystick, a touch-sensitive screen, etc. In some embodiments, the various components of the data processing device may be implemented as separate devices that are communicatively coupled to each other via wired or wireless connections. In other embodiments, some or all of the components may be integrated into a single device, e.g. in a tablet computer, a smartphone or the like.

The processing unit comprises a processor 114, e.g. microprocessor such as a CPU, and a storage device 117, e.g. a hard disk, an EEPROM, a RAM or another suitable data storage device having stored thereon a computer program 118 and a token database 119 of known game tokens and, optionally sets of game tokens. The token database may be stored separately from the computer program or as an integral part of the computer program. The token database 119 may alternatively be stored on a remote storage device accessible to the processing unit, e.g. via the internet or via another suitable communication channel.

When the computer program is executed by the processor 114 it implements a number of functional modules, including:
 a reading module 116 configured to receive a digital image from the digital image capturing device;
 a detection module 120 configured to detect one or more game tokens in a digital image and, optionally, to determine the relative position and orientation of the detected game tokens;
 a recognition module 121 configured to recognize one or more game tokens from a digital image;
 a game module 122 configured to control a digital game and to trigger game events in the digital game.

The reading module 116, the recognition module 121, the detection module 120 and the game module 122 may be implemented as different program modules of a software application or they may be integrated into a single program module. The reading module 116, the recognition module 121, the detection module 120 and the game module 122 may e.g. be implemented by a mobile application or a program executed on a client computer or other client device, thus eliminating the need for an internet connection or another network connection. Alternatively, the above modules may be implemented as a distributed system, e.g. a client-server or cloud-based architecture.

The reading module 116 is configured to receive an image, said image including an image of a number of game tokens that are arranged by a user so as to form a physical representation of a playing card 1008.

The detection module 120 is configured to detect one or more game tokens in said received image and their relative positions and, optionally, orientations within the image or at least their relative positions and, optionally, orientations, relative to each other. The detection module may further extract images of the detected game tokens from a background portion of the digital image. The detection module may thus be configured to segment a digital image and detect one or more game tokens in the digital image.

The recognition module 121 is configured to recognize the detected game tokens in a digital image, i.e. to recognise game tokens as known game tokens. For example, the recognition module may recognise a marker, e.g. a visible code or identifier, on a detected game token or otherwise recognise one or more features of the game token. To this end, the recognition module may have access to the token database 119 which may comprise a library of known game tokens. For each known game token, the library may comprise information about the marker, code, identifier or other set of features that identify the game token. For each known game token, the database may further comprise information identifying one or more game elements (e.g. game events, virtual game items such as characters or objects, game assets, etc.) associated with the respective game token. The recognition module is further configured to recognise a set of game tokens that are arranged to form a physical representation of a playing card 1008. The detection module and the recognition module may be implemented as separate modules or as a combined module.

The game module 122 uses the identifiers of the game tokens of the recognised set of game tokens that form the physical representation of a playing card and obtains the corresponding information identifying the corresponding game elements represented by the game tokens as well as information of a card configuration of a virtual playing card to be created. In particular, the game module obtains this information from the token database 119, e.g. a central database or a web source, e.g. via a web service or other network protocol. The game module is further configured to create a virtual playing card 1209 based on the obtained information and to execute a video game or other digital game experience which includes functionality for using the created virtual playing card as a part of the digital game experience. In some embodiments the game system may also be configured to recognise individual game tokens and perform game play responsive to the detection of individual game tokens.

Figure 2:
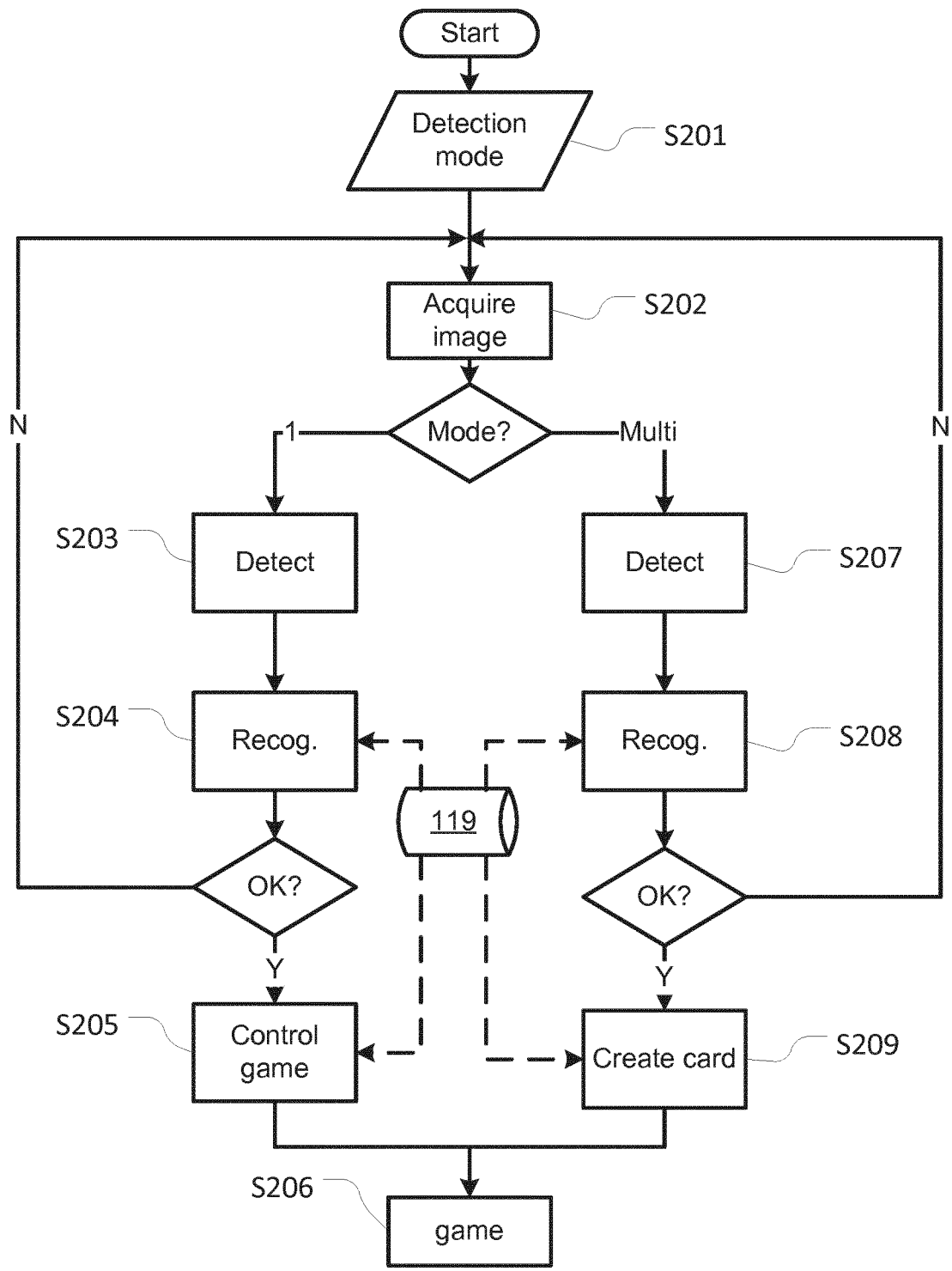
FIG. 2 shows a flow diagram an example of a method implemented by a game system described herein.

FIG. 2 depicts steps of a method implemented by a game system as disclosed herein, e.g. by the system of FIG. 1.

In an initial step S201, the process receives an indication, by means of a user-input, as to whether detection of a single game token is desired or detection of a set of multiple game tokens that form a representation of a playing card. In some embodiments, detection of multiple game tokens comprises the detection of a predetermined specific number of game tokens, e.g. always 3 game tokens or always 4 game tokens, etc. In other embodiments the number of game tokens in the sets may vary, i.e. some sets may include more game tokens than others. In any event, the process may provide a user-interface allowing the user a selection between two or more detection modes. It will be appreciated, that some embodiments of the process may provide more than two detection modes, e.g. for detecting sets in different spatial configurations or sets including different numbers of game tokens. Yet alternatively, some embodiments of the process may only provide a single detection mode, i.e. may only provide for the detection of sets of game tokens that form a representation of a physical playing card. It will be appreciated that in an embodiment where only a single detection mode is provided, step S201 may be omitted.

In subsequent step S202, the process reads one or more digital images; each image may represent a still image captured with a digital camera or a fragment of a video sequence captured with a digital video camera. The process may read the digital image from an input device, e.g. directly from an image capturing device, from a storage device, or the like.

If the user has selected detection a single game token, the process proceeds at step S203; if the user has detected detection of a set of multiple game tokens forming a playing card, the process proceeds at step S207. Hence the process branches out in two alternative paths. Again, in embodiments with more than two detection modes or with only a single detection mode, the process may branch out in more than two alternative paths or not branch out at all, respectively. Finally, in some embodiments, the process may automatically determine the detection mode at step S202, e.g. based on the number and configuration of game tokens detected in a captured image.

In step S203, the process performs a detection process on the captured image in order to detect a game token in the captured image. Generally, detection can be done in several ways, e.g. including the extracting of contours after edge detection with e.g. Canny algorithm, and then performing a recognition tasks for each image region where a contour is found, or by using a sliding window approach and by gathering top prediction scores and thus identifying regions of the image which contain objects that are likely toy object candidates. The detection may use a colour-based detection, edge detection, selective search or any other suitable detection method. The detection may be done by taking different subcrops of a digital image by a sliding window and/or following an edge recognition and/or contour extraction process and/or by another suitable detection algorithm. In some embodiments, the process may display, in real-time, the captured images on a display of the processing device. The process may also display an overlaid frame or similar indication or visual guide for guiding a user in positioning the camera such that the targeted game token is positioned at a predetermined position within the field of view, at a predetermined orientation and/or scale relative to the image capturing device, as this greatly facilitates the detection of the game token in the captured image.

In some embodiment, the process attempts detection and recognition of game tokens within the entire field of view of the camera. For example, the process may start recognizing game tokens (or at least has the capability of recognizing game tokens) once the game tokens enter the overall camera field of view, and are in sufficient focus and lighting to allow detection ad recognition. Hence, in such embodiments, the visual guides are a function of the user-interface that help the user center the intended target game tokens. Hence, in some embodiments, the detection and recognition of the game tokens may proceed even though the targerted game tokens are not propery algned with the vidual guide. Moreover, it will be appreciated that the process may cause the game experience move forward based on the recognised game tokens, even if the game tokens are not properly aligned with the visual guides. Alternatively or additionally, the process may provide further positioning guidance with arrows, pointers, colors, sounds, etc to help the user center the game tokens within the display area. It will be appreciated that, in other embodiments, the detection and recognition only proceeds in respect of game tokens positioned within a proximity of, or even properly aligned with, the visual guides.

In subsequent step S204, the process recognizes the detected game token that has been detected in the captured image. To this end, the process may detect one or more features of the game token, e.g. one or more features of a marker carried by the game token or another optically machine-readable code, or other suitable identifying information. The process may compare the detected features, code or other identifying information with corresponding information stored in a token library 119 of known game tokens so as to identify a matching game token.

It will be appreciated that steps S203 and S204 may be integrated into a single step. In any event, if the process fails to detect or reliably recognise a game token in the image, the process may terminate or return to e.g. step S202, optionally combined with a suitable message or instruction to the user as to how to capture an image of the game token.

Otherwise, the process proceeds at step S205 where the process determines which game element is associated with the recognised game token, e.g. which virtual game item or game asset or which game event, e.g. which game event is to be triggered by the recognition of the game token. To this end, the process may retrieve an identification of the game element associated with the recognised game token from the library 119 of known game tokens. The process then controls game play responsive to the recognised game token and based on the obtained information about the associated game element; finally, the process proceeds at step S206.

In subsequent step S206, the process may proceed with the digital game or allow the user to capture further images of game tokens.

In step S207, the process performs a detection process on the captured image in order to detect two or more game tokens in the captured image that are positioned in a predetermined spatial configuration. Generally, the detection process may be similar to the process described in connection with step S203 above, but where the process detects multiple game tokens in the image and where the process may further detect the relative position and orientation of the detected game tokens in the image. As in the detection step S203, the process may display, in real-time, the captured images on a display of the processing device. The process may also display an overlaid frame or similar indication for guiding a user in positioning the camera and the game tokens such that the targeted game tokens are positioned at a predetermined position, orientation and scale relative to the captured image and relative to each other, as this greatly facilitates the detection of the game tokens in the image.

In step S208, the process recognizes the detected game tokens based on detected features or other suitable identifying information as described for the case of a single token in step S204. As in the case of a single game token, it will be appreciated that steps S207 and S208 may be integrated into a single step. In any event, if the process fails to detect or reliably recognise the expected number of game tokens in the image, the process may terminate or return to e.g. step S202, optionally combined with a suitable message or instruction to the user as to how to position the game tokens and how to capture an image of the game tokens. For example, in an embodiment, where all sets of game tokens consist of a predetermined number of (e.g. three) game tokens, a successful recognition requires the recognition of said predetermined number of tokens, optionally in the predetermined spatial configuration relative to each other.

Upon successful recognition of a set of game tokens, in step S209, the process determines which virtual playing card is to be created responsive to the recognition of the set of game tokens. To this end, the token library 119 of game tokens may further comprise a library of possible virtual playing cards where each record in the library of virtual playing cards includes identifications of the members of the set of game tokens that trigger creation of the card, and information indicative of a the playing card associated with the set. Alternatively, the process may identify the individual game tokens and the respective game elements associated with them, and then determine the attributes of a virtual playing card to be created from the identified game elements and based on a set of predetermined rules. In any event, the process creates a virtual playing card, e.g. a suitable data structure representing the virtual playing card, and proceeds at step S206.

FIG. 3 illustrates an example of a structure of a token library, generally designated by reference numeral 119. The token library 119 includes a table 310 of individual game tokens. The table includes a plurality of records, e.g. arranged as rows in a table, where each record is associated with a known game token. Each record in table 310 includes a token identifier 311 and an associated individual game element identifier 312. Optionally, the record may include further information, such as additional identification information for use during recognition of a game token in an image in embodiments where the token identifier is not sufficient.

In some embodiments, the library includes a second table 320 of virtual playing cards, where each record in table 320 is associated with a known set of multiple event tokens that correspond to a virtual playing card. Each record includes a set identifier 321 identifying the set of tokens. Each record further includes the identifiers 322 of the individual tokens forming the set and an identifier 323 of an associated virtual playing card and/or other information pertaining to the associated playing card. The identifiers 322 of the individual tokens may point to the individual token identifiers 311 of the table 310. Optionally, each record may further include information 324 about the required spatial configuration in which the members of the set have to be arranged in order to be recognised as a set. In embodiments where all sets are associated with the same spatial configuration, this entry may of course be omitted. In the example of FIG. 3, each set includes three game tokens. In other embodiments, the number of tokens per set may be different or even vary from set to set. It will further be appreciated that the token library may further include records related to other types of game tokens and/or other types of combinations of game tokens.

Figure 4A:
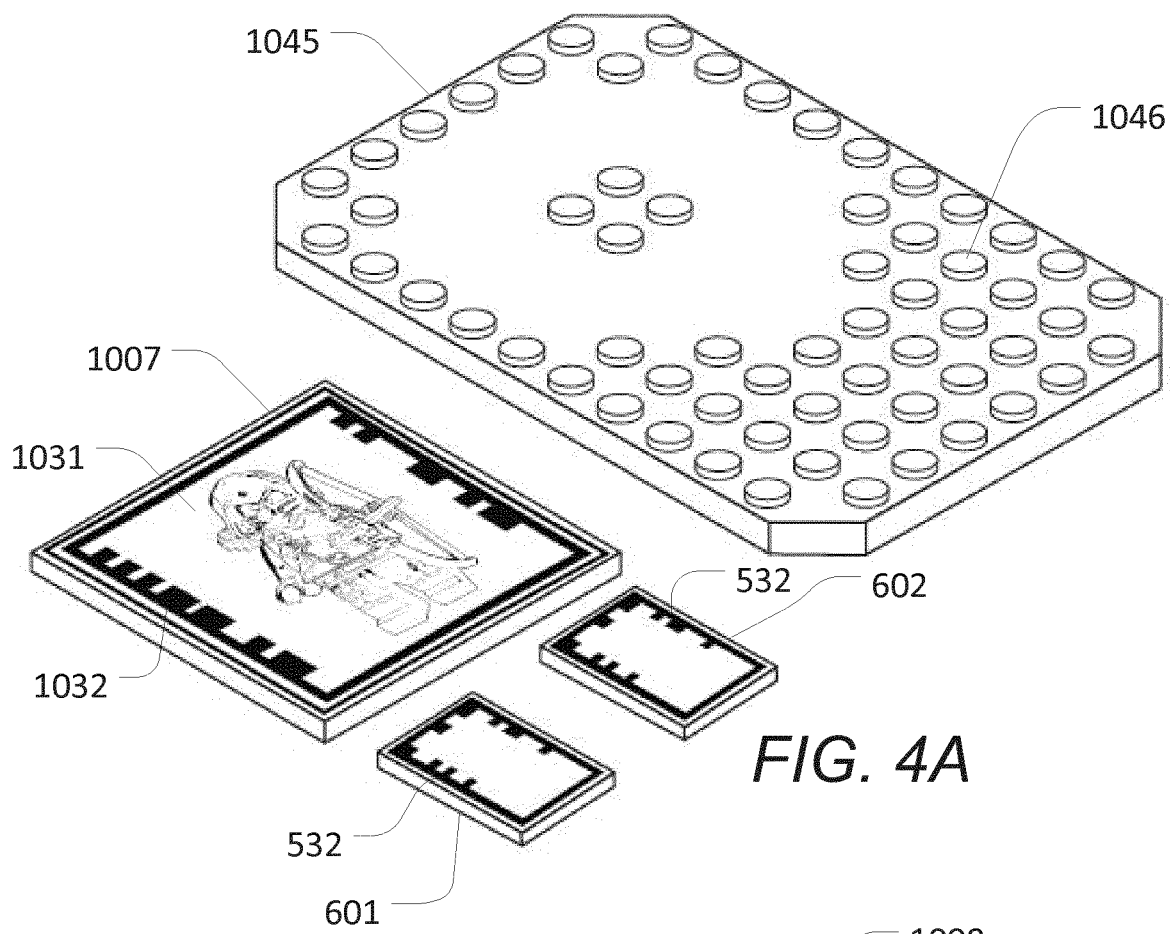
FIGS. 4A-B illustrate assembly of a toy model representing a playing card.
Figure 4B:
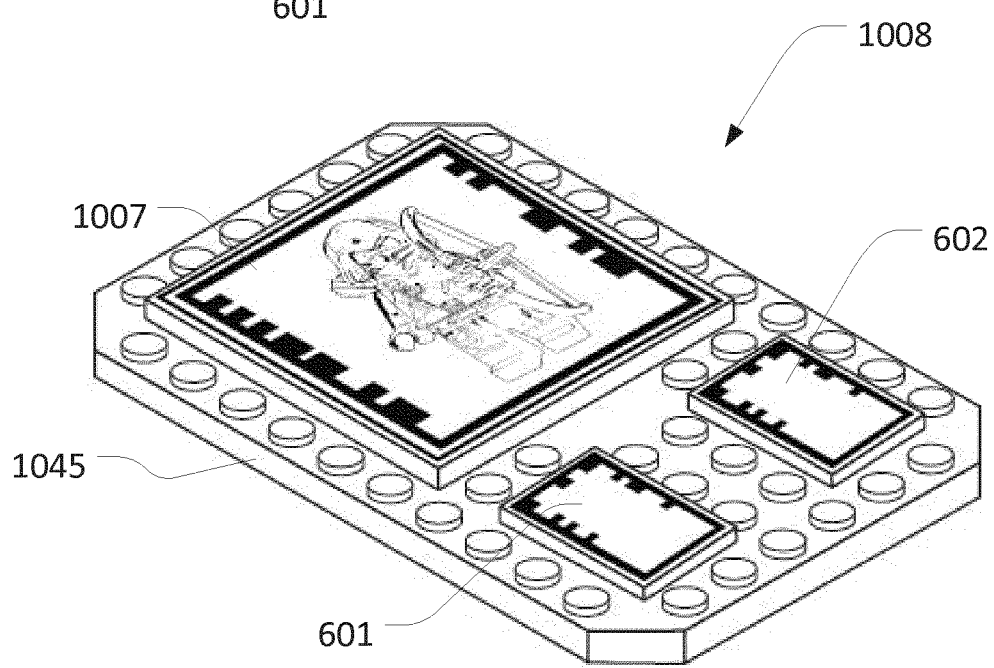

FIGS. 4A-B illustrate an assembly of a toy model representing a playing card. In particular, FIG. 4A illustrates a plurality of toy construction elements 601, 602, 1007 and 1045 for creating a toy model representing a playing card. The toy construction elements are construction elements compatible with a toy construction system; they include coupling members 1046 configured for detachably connecting the toy construction elements to other toy construction elements of the toy construction system. The plurality of toy construction elements includes a plurality of game tokens 601, 602 and 1007, in particular a character token 1007 and game tokens 601, 602 of a second type, e.g. asset tokens representing various game assets. The game tokens 601 and 602 each have the form of a plate having a rectangular periphery. Generally, the token may be manufactured from any suitable material, such as plastic, metal or wood, preferably sufficiently rigid to allow detachable mechanical connection to a base plate or other support member, e.g. by interlocking and/or friction-based attachment. The token further defines an axis extending through a geometric centre of the plate and along the direction of the longer edges of the rectangle, thus allowing a process to define an orientation of the token. It will be appreciated that other embodiments of tokens may be a different shape, such as a plate having a differently-shaped periphery, or a cube or any other three-dimensional shape.

The token defines a top surface which is decorated by a suitable decoration, e.g. as illustrated by decoration 1031 of the character token 1007. The illustration may illustrate the game element represented by the game token. The token is further provided with a machine-readable code 532 which in this example is provided as lines extending along the periphery of the top surface of the token. The lines have narrow and wide portions where the positions and dimensions of the narrow and wide portions encode a token identifier. It will be appreciated that other embodiments of game tokens may be provided with other visually detectable markers, such as QR codes, color codes, etc. In some embodiments, the markers may be integrated into the decoration, e.g. in a manner that the marker can readily be recognised as a marker or in an imperceptible manner. In some embodiments different sides of a game token may be provided with different codes or markers such that a token may trigger different game elements depending on which side is visible to the camera which is used to capture an image of the game token. The codes may also be used to define an orientation of the game token.

The game tokens 601 and 602 may represent respective game assets, such as weapons or other accessories or capabilities that can be assigned to a virtual character in the digital game. Accordingly, the game tokens 601 602 will also be referred to as asset tokens. The character token 1007 may also be a physical element of the type described above with reference to tokens 601 and 602. However, the character token may have a size and/or shape and/or decoration different from the game tokens 601 and 602 so as to make them easily distinguishable from each other. The character token may have a machine-recognisable marker 1032 similar to the markers described in connection with the asset tokens 601 and 602.

The plurality of toy construction elements further includes a token holder, in the present example a base plate 1045. The base plate has a top surface that comprises a grid of coupling members 1046 to which mating coupling members of the game tokens can be attached. The bottom surface of the game tokens 601, 602 and 1007 comprise coupling members (not shown) such that the coupling members of the tokens and the coupling members of the base plate can engage each other in a mating connection for detachably attaching the game tokens to the base plate 1045 or to another token holder.

In some embodiments, the base plate 1045 only comprises coupling members that allow a predetermined number and/or type of game tokens to be attached to the base plate in a predetermined spatial configuration, in particular at predetermined positions on the top surface of the base plate and/or in a predetermined orientation. In other embodiments, e.g. as illustrated in FIG. 4A, the base plate may comprise coupling members that allow other toy construction elements, other than the game tokens, to be attached to the base plate, e.g. decorative elements.

The base plate 1045 may have a shape and size resembling a regular playing card, e.g. a generally rectangular shape, e.g. having a short edge between 5 cm and 7 cm, e.g. between 5.5 cm and 6.5 cm and a long edge between 8 cm and 10 cm, e,g. between 8.5 cm and 9 cm or having a rectangular shape and an aspect ratio of a regular poker card or bridge card.

In other embodiments, the base element may have a form different from a plate, e.g. a frame such as a rectangular frame having coupling members that allow attachment of the game tokens inside the frame. I yet further embodiments, the game tokens may include tokens that have a three-dimensional representation of e.g. a game character or another type of game asset. In yet another embodiment, one or more of the game tokens (e.g. the character token) may also function as a token holder (e.g. a base plate) to which other game tokens may be attached, e.g. such that the game token has coupling members on its top surface to which other game tokens (e.g. game tokens of the same or a different type) can be attached. In this case, a separate token holder/base plate may thus not be needed.

FIG. 4A shows a single character token 1007 and two asset tokens 601 and 602. It will be appreciated that a game system may comprise a larger number of game tokens that may be combined in different ways so as to craft different sets of game tokens and, hence, to represent different virtual playing cards. For example, a game system may comprise a plurality of different character tokens representing respective characters (and/or other item tokens representing other types of virtual game items) and a plurality of asset tokens representing respective assets that may be associated with the various virtual characters represented by the character tokens (and/or other game tokens of a second type, different from the item tokens).

FIG. 4B shows a toy construction model representing a playing card 1008 assembled from the toy construction elements shown in FIG. 4A. In particular, the game tokens 601, 602 and 1007 are detachably attached to the coupling members 1046 on the top surface of base element 1045. The playing card of FIG. 4B is constructed from a single character token 1007 and two asset tokens 601 and 602. It will be appreciated, however, that other embodiments of playing cards may be represented by a different number and/or by different types of game tokens, e.g. by an item token and one, two, or more tokens of a second type, different from an item token.

With reference to FIG. 5-8 an example of the detection and recognition of game tokens representing a playing card of the type shown in FIG. 4B, as well as further aspects of a digital card game, will now be described. The detection and recognition may e.g. be performed by the method of FIG. 2.

Figure 5:
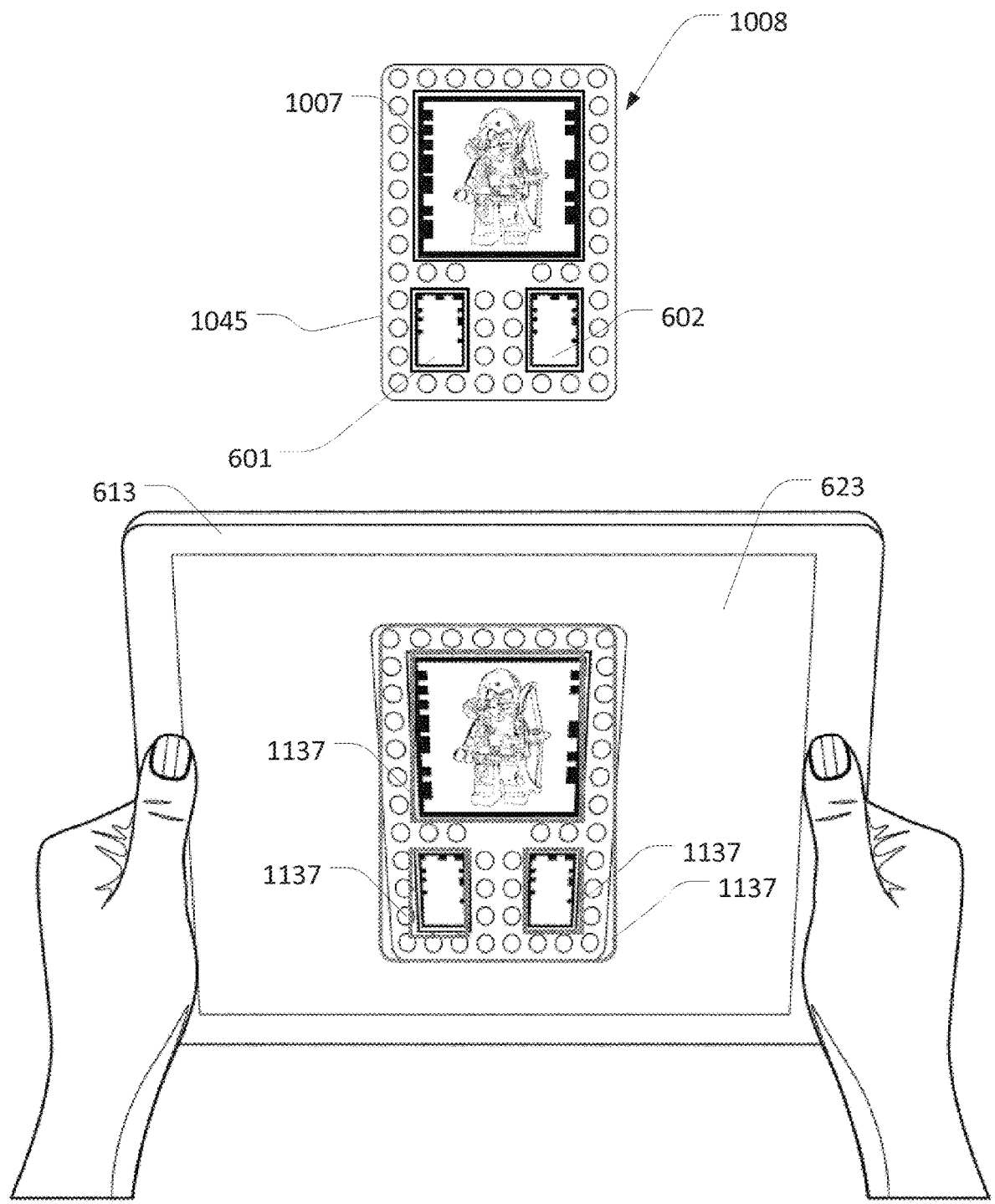
FIG. 5 illustrates an example of the detection and recognition of game tokens arranged to represent a playing card.

FIG. 5 shows a portable processing device 613, in this example a tablet computer having a touch-screen display and a built-in camera. The portable processing device 613 is held by a user such that the camera of the portable processing device captures an image of a toy construction model 1008 which is placed on a table or a similar surface. In the example of FIG. 11, the toy construction model represents a playing card as described in connection with FIGS. 4A-B. The portable processing device displays the image captured by the camera on the display 623, optionally overlaid/augmented with visual guides 1137 for facilitating correct alignment. In this example, the processing device detects and recognises character token 1007 and additional asset tokens 601 and 602 positioned in the predetermined spatial configuration, e.g. with the asset tokens 601 and 602 positioned at predetermined positions and/or orientations relative to the character token 1007. For example, in some embodiments, if there are not the required number of game tokens and/or not the required numbers of each of the different types of game tokens, e.g. of character tokens and asset tokens, the processing device may not recognise the toy model as representing a playing card. Similarly, in some embodiments, if the game tokens are not arranged at their prescribed relative positions and/or relative orientations, at least not within certain, e.g. predetermined, tolerances the processing device may not recognise the toy model as representing a playing card. Nevertheless, in some embodiments, detection of additional game tokens, in addition to the prescribed number and types of game tokens, may not influence the detection of the playing card.

In the present example, the game tokens are attached to the base plate 1045 which serves to facilitate correct relative placement of the game tokens relative to each other. In some embodiments, the game tokens may not have to be physically interconnected e.g. by connecting them to a common token holder, e.g. a common base plate. Instead, it may be sufficient, if they are placed in the predetermined spatial configuration (e.g. within a predetermined proximity of each other) when their image is captured by the image capturing device. It will thus be appreciated that, in some examples, the game tokens may also be recognised as representing a playing card, if they are placed on a table top or other surface without the base plate 1045, as long as the game tokens are positioned in a suitable relative positions and, optionally orientation, relative to each other.

Generally, in some embodiments, the recognised spatial configuration may be defined by the two-dimensional geometry in which the game tokens are placed on the table or other surface or attached to the token holder, i.e. the relative positions and orientations of the tokens in the image captured by the camera of the processing device. In this example, the configuration may be defined by the positions and, optionally, orientation of the code patterns along the border of the tokens. It will be appreciated that the recognition of a predetermined spatial configuration may be associated with a certain detection accuracy such that positions and/or orientations within a certain range may be recognised as being conform to the predetermined spatial configuration.

In the specific example of FIG. 5, the game system recognises the toy model as a representation of a playing card if and only if the process detects a character token and two further game tokens of a second type, such as asset tokens, as described above. It will be appreciated that other embodiments may use other criteria for detecting a representation of a playing card.

Upon recognition of the game tokens 1007, 601 and 602 arranged in the predetermined spatial configuration, the processing device creates a virtual playing card. For example, the process may create an instance of a suitable data structure comprising information about relevant attributes of the created playing card and/or a graphical representation of the created virtual playing card. In the present example, the virtual playing card represents the virtual character and/or game assets represented by the recognised game tokens 1007, 601, 602. In this specific example, the virtual playing card represents a virtual character and two game assets associated with the virtual character. The processing device may associate additional game-related attributes to the created virtual playing card, such as a health attribute, a strength attribute, or the like. Another example of such a game-related attribute may include an attribute indicating a cost of using the virtual playing card in the game, e.g. a cost represented as in in-game currency, an amount of energy, or the like. In particular, the processing device may determine respective values of the game related attributes responsive to the recognised game tokens and/or the recognised combination of game tokens. For example, each game token may have a base value of a game-related attribute associated with it. The base values may e.g. be stored in a token library as described herein. The processor may then compute a combined value of the game-related attribute as a sum of the individual base values. Additionally or alternatively, a predetermined combination of a particular virtual character token and a particular auxiliary game token may cause the processor to determine an increased health value to be associated with the created virtual playing card. Similar, the character tokens and event tokens may be grouped into different classes of game tokens, e.g. represented by a color or another distinguishing property of the game tokens. The processing device may then determine a value of a game-related attribute based on whether the recognised game tokens are game tokens of the same class or of different classes of game tokens. The processing device may store the virtual playing card as part of a deck of virtual playing cards.

Optionally, the processing device may illustrate the successful recognition of toy model 1008 as a representation of a playing card, e.g. by displaying the captured image augmented with a blinking frame surrounding the recognised toy model. It will be appreciated that the processor may use other suitable mechanisms to indicate that a representation of a playing card has been detected and/or which game tokens have been detected as representing the playing card. In some embodiments, the processing device may even indicate a visual representation of the created virtual playing card and/or the effect the created virtual playing card may have when used in the digital game, e.g. by augmenting or replacing the captured image with a suitable graphical representation or by providing a subsequent animation illustrating the virtual playing card and/or its use/effect in the game, e.g. as described in connection with FIG. 6 Additionally or alternatively to a graphical representation and/or an animation, the successful recognition and/or the creation of a virtual playing card may be illustrated by sound or vibration or other movements.

Figure 6:
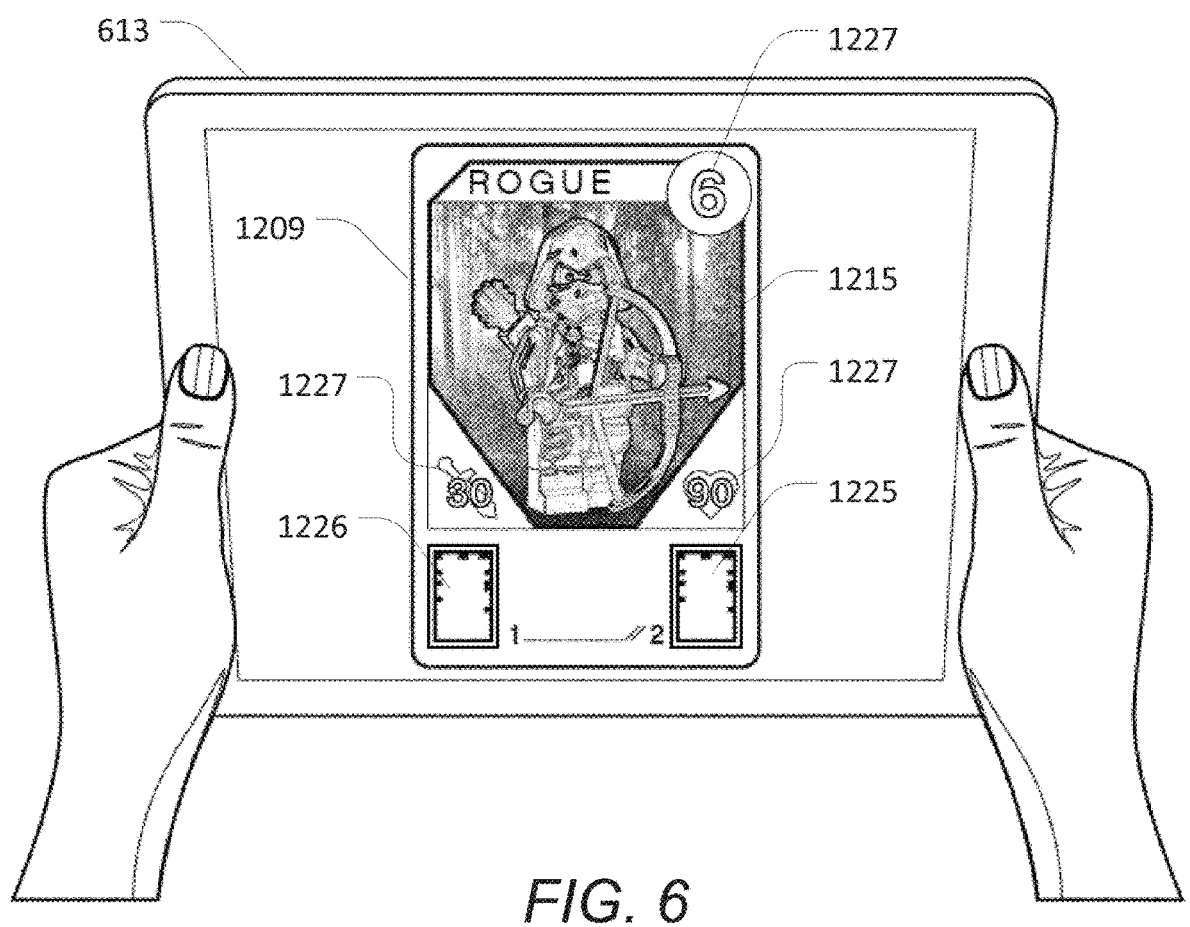
FIGS. 6-8 illustrate aspects of a digital card game.
Figure 7:
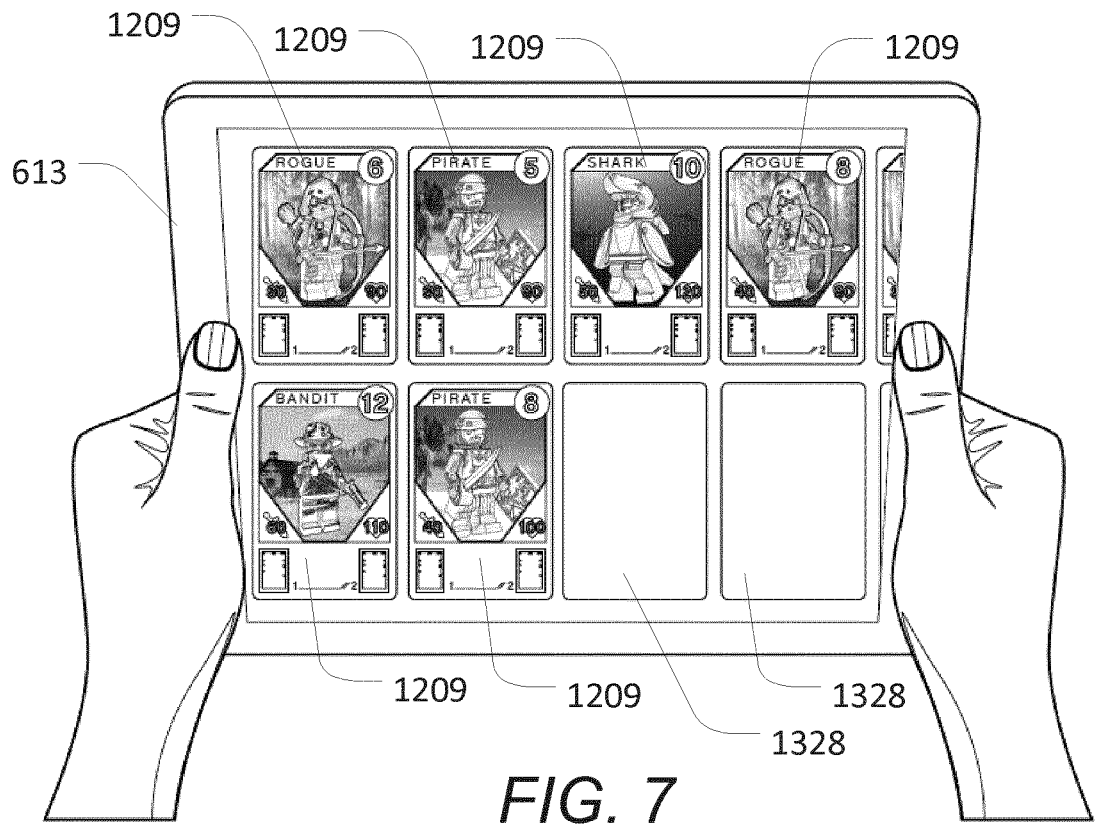
Figure 8:
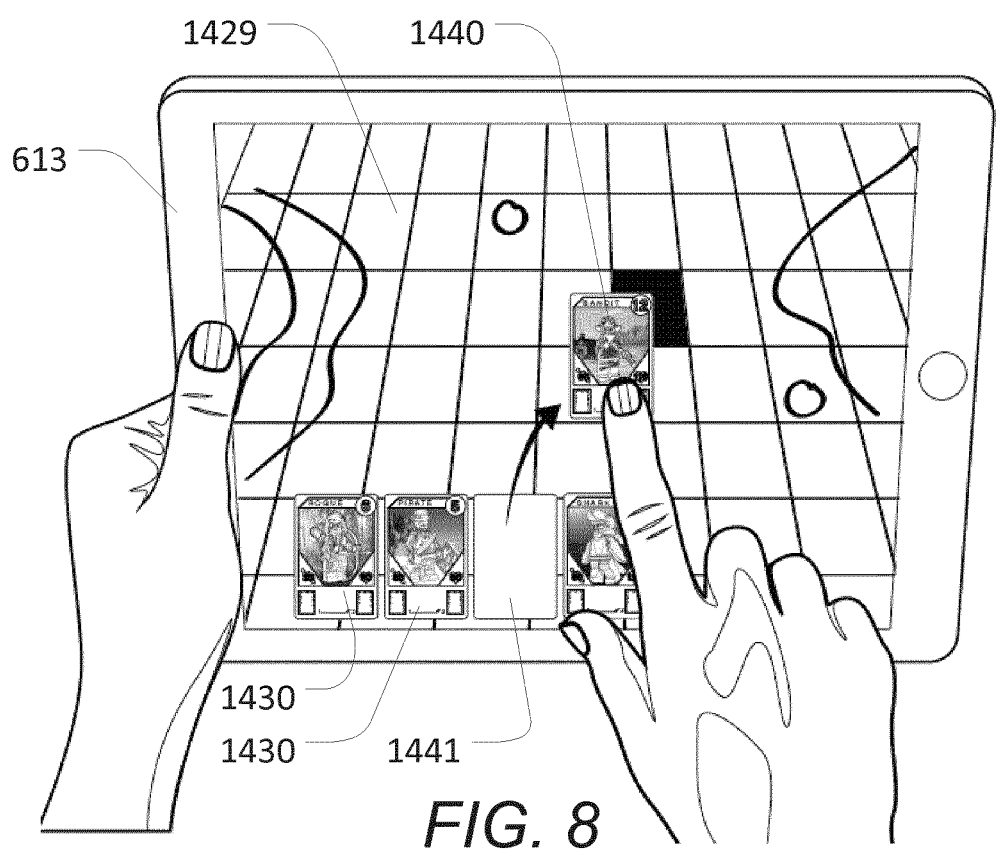

FIGS. 6-8 illustrate aspects of a digital card game. In particular FIGS. 6-8 illustrate examples of graphical user interfaces presented on a display of a portable processing device 613 that executes an embodiment of a digital card game as described herein.

In particular, FIG. 6 illustrates a digital representation of a virtual playing card, presented by portable processing device 613 on the display of the portable processing device. The virtual playing card 1209 is a user-created virtual playing card which the portable processing device has created responsive to the user having captured an image of a toy construction model representing a playing card. The virtual playing card 1209 shown in FIG. 6 has been created by capturing an image of the toy construction model 1008 shown in FIGS. 4B and 5. As can be seen from a comparison of FIGS. 5 and 6, the virtual representation of the virtual playing card 1209 is not an accurate, e.g. photorealistic, representation of the toy construction model 1008 but rather a graphical representation of a regular playing card having a card-specific decoration. Nevertheless, the virtual playing card includes symbols, e.g. in the form of pictures, graphical illustrations or other form of images, representing the game assets and the virtual character represented by the game tokens on which the creation of the virtual playing card was based. In the example of FIG. 6, the virtual playing card includes a first image 1215 of a virtual character and symbols 1225 and 1226 and/or further images illustrating respective game assets, such as capabilities, weapons, accessories, etc. The virtual character represented by image 1215 is the virtual character represented by the character token 1007 and the game assets represented by symbols 1225 and 1226 are the game assets represented by asset tokens 601 and 602 of the toy construction model 1008 of FIG. 6. The representations 1215, 1225 and 1226 are arranged on the top side of the virtual playing card in a geometric arrangement generally corresponding to the spatial configuration of the corresponding game tokens on the base plate of the toy construction model 1008. The digital representation of the virtual playing card 1209 further includes representations 1227, including numeric values, of a number of additional game-related attributes associated with the virtual playing card, e.g. a health value, a strength value and/or a cost value.

FIG. 7 illustrates a user interface that allows a user to manage a virtual deck of virtual cards. The user interface allows the user to view the virtual cards in the current deck of cards, select one or more cards, customize cards, add cards to the deck, remove cards from the deck, etc. For example, the user interface may display the virtual playing cards 1209 arranged side by side as illustrated in FIG. 7, or in another suitable way that allows a user to select and view individual cards. The user interface includes one or more empty slots 1328 in the arrangement of virtual cards. If the user selects an empty slot, the process may initiate a card creation module allowing a user to create one or more new virtual cards and add the newly created card to the deck. In some embodiments, the size of the deck of cards may be limited to a predetermined maximum number of cards while other embodiments may allow for unlimited numbers.

Creation of new virtual cards may be performed by acquiring an image of a physical toy model representing the card as described herein. Some embodiments, of a digital game may further provide alternative functions for creating virtual playing cards. For example, the digital game may provide functionality for digitally crafting playing cards, e.g. by providing a user interface where a user may select game tokens from a collection of virtual game tokens and arrange them to form a virtual representation of a playing card. For example, the collection of virtual game tokens may comprise game tokens that a user has previously created by acquiring images of physical game tokens as described herein.

In yet further embodiments, the game system may provide functionality that allows a user to customise virtual playing cards, e.g. by changing the way the cards are represented. For example, the user may be able to change the visual appearance of the digital playing cards, e.g. by adding decoration elements, changing the visual representation of the virtual characters to which a card relates, etc.

The digital game may further provide functionality for representing the effect of the virtual playing cards in the game. For example, a user may select one of the playing cards in the user's deck and the game may present a graphical animation or other representation of the effect a virtual playing card has when used in the digital game.

FIG. 8 illustrates use of the virtual playing cards in a battle type game. The display shows a virtual environment 1429 representing a battle ground where virtual characters may battle, or otherwise compete, against other characters, e.g. against computer-controlled non-player characters or virtual characters controlled by another player. The display area further shows virtual playing cards 1430 from a virtual deck of playing cards. During the course of a battle, the user may select one or more of the playing cards, e.g. by dragging and dropping a virtual playing card 1440 to a user-selected position within the virtual environment. Responsive to this selection, the game may spawn a virtual character at the selected location and control the spawned virtual character to participate in a battle. The spawned virtual character is the virtual character represented by the selected virtual playing card, and the spawned virtual character carries, or has otherwise associated with it, the game assets represented by the selected virtual playing card, e.g. one or more capabilities, weapons, armour, etc. The spawned virtual character may further have associated with it one or more additional game-related attributes responsive to the corresponding game-related attributes associated with the selected virtual playing card, e.g. a health level, a strength level, etc. Selection of a playing card may cause the virtual playing card to be removed from the display, e.g. in embodiments where each virtual card can only be played once during the course of a battle. The spot 1441 that has previously been occupied by the selected virtual playing card may then be filled with another virtual playing card from the user's virtual deck of cards. In some embodiments, selecting and using a virtual playing card as described above may have an in-game cost associated with it, e.g. a cost indicated on the virtual playing card. Hence, selecting and playing a virtual playing card may cause an in-game resource to be depleted, e.g. an in-game currency, an energy or the like.

It will be appreciated that virtual playing cards may be used in other types of games and are not limited to battle-type games, e.g. social games, nurture games, trading card games, etc. Generally, virtual playing cards may influence game play in a variety of ways, e.g. by progressing a story, modifying a virtual environment, modifying virtual game items, unlocking, spawning or otherwise adding virtual game items into a virtual game environment.

Although the invention has been described with reference to certain specific embodiments, various modifications thereof will be apparent to those skilled in art without departing from the spirit and scope of the invention as outlined in claims appended hereto.

The invention claimed is:

1. A game system comprising:
a plurality of game tokens representing non-character game assets, wherein the plurality of game tokens comprises two or more game tokens;
an image capturing device; and
a processor;
wherein the image capturing device being operable to capture one or more images of the two or more game tokens placed within a field of view of the image capturing device, and
wherein the processor is configured to:
execute a digital game, the digital game comprising computer executable code configured to cause the processor to implement a virtual card game, the virtual card game including a plurality of virtual playing cards;
receive one or more images captured by said image capturing device;
recognize the two or more game tokens of the plurality of game tokens as a set of game tokens within the one or more images; and
responsive to recognizing the set of game tokens in the one or more images, create a virtual playing card based on the recognized set only when the two or more game tokens are positioned in a predetermined spatial configuration relative to each other.

2. The game system according to claim 1, wherein each game token carries a visually recognizable marker identifying the game token.

3. The game system according to claim 1, wherein the digital game is operable, responsive to receiving a user input indicative of a user's intention to use the created virtual playing card in the digital game, to activate a user-activatable game asset associated with the virtual playing card.

4. The game system according to claim 1, wherein the predetermined spatial configuration comprises a two dimensional arrangement of two or more game tokens within a two-dimensional perimeter representing a playing card.

5. The game system according to claim 1, wherein the predetermined spatial configuration is defined completely or in part by predetermined positions and/or orientations of the event tokens relative to each other within the one or more images.

6. The game system according to claim 1, wherein the processor is configured to create the virtual playing card with a visual appearance representing the recognised set of game tokens.

7. The game system according to claim 1, wherein the image capturing device and the processor are integrated into a single data processing device.

8. The game system according to claim 1, wherein the computer executable code is further configured to cause the processor to control at least a first virtual game item, wherein the plurality of game tokens comprises a first item token representing the first virtual game item, and wherein the processor is further configured to:
responsive to recognizing a first set of game tokens, the first set comprising the first item token and at least one game token representing a first game asset, create a first virtual playing card; and
responsive to receiving a user input indicative of a user's intention to use the created first virtual playing card during the digital game, associate the first game asset to the first virtual game item.

9. The game system according to claim 8, wherein the processor is configured, responsive to receiving said user input, to insert the first virtual game item into a virtual game environment; and to associate the first game asset to the first virtual game item.

10. The game system according to claim 1, further comprising a token holder for detachably receiving two or more game tokens.

11. The game system according to claim 10, wherein the token holder comprises one or more coupling members operable for receiving game tokens in predetermined respective positions and orientations relative to the token holder such that the two or more game tokens can be detachably received by the token holder in a predetermined spatial configuration.

12. The game system according to claim 11, wherein the one or more coupling members are operable for receiving game tokens in predetermined respective positions and orientations relative to the token holder such that the two or more game tokens can only be detachably received by the token holder in said predetermined spatial configuration relative to each other.

13. The game system according to claim 1, wherein the game tokens are tiles connectable to a support plate.

14. The game system according to claim 13, wherein each tile has a visual appearance such that a representation of each tile in a captured image is not rotationally symmetric within a two-dimensional image plane defined by the captured image.

15. A method, implemented by a processor, of operating a game system, the game system comprising a plurality of game tokens representing non-character game assets, the plurality of game tokens having two or more game tokens, an image capturing device and the processor, and the image capturing device being operable to capture one or more images of the two or more game tokens placed within a field of view of the image capturing device, wherein the method comprises:

executing a digital game, the digital game comprising computer executable code configured to cause the processor to implement a virtual card game, the virtual card game including a plurality of virtual playing cards;

receiving one or more images captured by said image capturing device;

recognizing the two or more game tokens of the plurality of game tokens as a set of game tokens within the one or more images; and responsive to recognizing the set of game tokens in the one or more images, creating a virtual playing card based on the recognized set only when the two or more game tokens are positioned in a predetermined spatial configuration relative to each other.

16. A processing device comprising a processor configured to perform the method defined in claim 15.

17. A computer program comprising program code adapted to cause, when executed by a processing device, the processing device to perform the method defined in claim 15.

18. A system, comprising a plurality of event tokens and instructions to obtain a computer program as defined in claim 17 and to execute the obtained computer program on a processing device.

* * * * *